United States Patent [19]

Tzeng

[11] Patent Number: 5,715,172
[45] Date of Patent: Feb. 3, 1998

[54] METHOD FOR AUTOMATIC CLOCK QUALIFIER SELECTION IN REPROGRAMMABLE HARDWARE EMULATION SYSTEMS

[75] Inventor: Ping-San Tzeng, San Jose, Calif.

[73] Assignee: Quickturn Design Systems, Inc., Mountain View, Calif.

[21] Appl. No.: 638,309

[22] Filed: Apr. 26, 1996

Related U.S. Application Data

[63] Continuation of Ser. No. 296,743, Aug. 26, 1994, abandoned.

[51] Int. Cl.[6] .................... G06F 15/00; G01R 31/28
[52] U.S. Cl. .................... 364/490; 364/489; 364/491; 364/580; 371/22.1; 371/22.2; 395/183.01; 326/41; 326/46; 327/211; 327/213
[58] Field of Search .................... 364/488, 489, 364/490, 491, 578, 580; 371/22.2, 22.1, 22.4, 22.6, 22.3, 25.1, 22.5; 326/40–43, 93, 95, 38, 46–50, 39, 36, 44; 395/500, 551–556, 183.13, 183.09, 183.01, 183.04, 183.1, 183.17; 327/203, 210–218, 141, 198–199

[56] References Cited

U.S. PATENT DOCUMENTS

| T935,003 | 6/1975 | Linville | 364/490 |
|---|---|---|---|
| 4,263,651 | 4/1981 | Donath et al. | 364/300 |
| 4,698,760 | 10/1987 | Lembach et al. | 364/490 |
| 4,924,430 | 5/1990 | Zasio et al. | 364/578 |
| 5,077,676 | 12/1991 | Johnson et al. | 364/489 |
| 5,095,454 | 3/1992 | Huang | 364/490 |
| 5,168,455 | 12/1992 | Hooper | 364/490 |
| 5,210,700 | 5/1993 | Tom | 364/489 |
| 5,218,551 | 6/1993 | Agrawal et al. | 364/491 |
| 5,237,514 | 8/1993 | Curtin | 364/490 |
| 5,325,309 | 6/1994 | Halaviati et al. | 364/489 |
| 5,345,401 | 9/1994 | Tani | 364/491 |
| 5,416,918 | 5/1995 | Gleason et al. | 395/556 |
| 5,452,239 | 9/1995 | Dai et al. | 364/578 |
| 5,475,830 | 12/1995 | Chen et al. | 364/490 |
| 5,481,695 | 1/1996 | Parks | 395/500 |
| 5,550,748 | 8/1996 | Xiong | 364/490 |

OTHER PUBLICATIONS

Malik et al: Retiming and resynthesis—Optimizing sequential networks with combinational techniques, IEEE, Oct. 1989.

Dey et al: Retiming sequential circuits to enhance testability, IEEE, Jun. 1994.

Chakraborty et al: Delay independent initialization of sequential circuits, IEEE, Jan. 1994.

Kahng et al., "High Performance Clock Routine Based on Recursive Geometric Matching," ACM/IEEE, 1991, pp. 322–327.

*Primary Examiner*—Jacques Louis-Jacques
*Attorney, Agent, or Firm*—Lyon & Lyon LLP

[57] ABSTRACT

A method of identifying potential clock qualifiers in netlist description of an integrated circuit, the netlist comprising logic elements. The method comprises the steps of initializing every net of the netlist to a speed of zero, identifying all potential clock nets so that all signals with a path to a clock source has a speed of one, computing the maximum speed of each output net of each of the logic elements in the netlist, and marking as a potential clock qualifier any net of the netlist that is input to the logic elements in the netlist that is slower than the maximum speed of any net that is input to the logic elements.

2 Claims, 6 Drawing Sheets

METHOD FOR AUTOMATIC CLOCK QUALIFIER SELECTION IN REPROGRAMMABLE HARDWARE EMULATION SYSTEMS

This is a continuation of prior complete application Ser. No. 08/296,743, filed on Aug. 26, 1994 now abandoned.

BACKGROUND OF THE INVENTION

1. Field of the Invention

The present invention relates generally to the field of emulation technology, whereby circuits containing combinational logic elements and sequential logic elements are emulated and more particularly concerns methods for automatically selecting clock qualifier signals from a netlist description of the circuit undergoing emulation, thus, reducing the occurrence of timing related violations such as hold-time violations.

2. Prior Art

When designing integrated circuits, a netlist description of the integrated circuit is generated. The netlist is a description of the integrated circuit's components and electrical interconnections between the components. The components include all those circuit elements necessary for implementing a logic circuit, such as combinational logic (e.g., gates) and sequential logic (e.g., flip-flops and latches).

In the electronics industry, integrated circuits containing larger quantities of both combinational and sequential logic are becoming more common. This increased complexity and density has brought about the need for more powerful electronic design automation tools that aid the circuit designer in designing these circuits. An example of such a tool is a reconfigurable hardware emulation system. Examples of such emulation systems are described in U.S. Pat. Nos. 5,109,353 and 5,329,470 to Sample et al and 5,036,473 to Butts et al, the disclosures of which are both hereby incorporated by reference. As described in the Sample et al and Butts et al patents, emulation systems can be used to verify that an integrated circuit design actually works in the system in which it will be installed prior to having to commit the integrated circuit to silicon.

Generally, reconfigurable emulation systems operate by taking a user's netlist and implementing it in the emulation system. Emulation systems typically are comprised of multiple reconfigurable logic devices interconnected via various interconnection technologies. These reconfigurable logic devices typically comprise programmable logic devices such as field programmable gate arrays (FPGAs) and other programmable logic devices capable of implementing large quantities of combinational and sequential logic and memory elements. FPGAs, for example, contain logic cells that implement the combinational, sequential and memory components (in FPGAs such as those manufactured by Xilinx, Inc., San Jose, Calif., the logic cells are referred to as configurable logic blocks, or "CLBs"). The netlist can be implemented in the emulation system by programming the programmable logic devices configure the internal logic cells in accordance with the design being emulated. However, because the emulation system must be capable of handling many different types of functional circuit designs, the programmable logic devices must be general logic devices capable of implementing many different functions. Because of this, each programmable logic device can only hold a small portion of the design being implemented. Thus, a practical emulation system usually requires large quantities of programmable logic devices and a programmable interconnect for interconnecting the programmable logic devices.

A netlist designed to be implemented as a single, customized integrated circuit, cannot simply be placed in the emulation system. Consequently, when implementing the netlist in the emulation system, several processing seeps must first take place. A detailed discussion of how a netlist is processed prior to implementation in a reconfigurable hardware emulation system is described in both the Sample et al and Butts et al patents. A further discussion of how a netlist is processed for implementation in a reconfigurable hardware emulation system is discussed in European Patent Application No. 0 559 822 by Chen et al.

As discussed in the Chen et al application, one problem associated with prior art emulation systems is the occurrence of hold time violations. Hold time violations occur in emulation systems when emulating a circuit design having a relatively complex clock structure. Specifically, a hold time violation can occur when the delay from the clock source to the clock pin on a storage element is relatively long but the data path from that same clock source to the data input terminal on the same storage element is relatively short. This disparity in clock delay relative to data path transmission time can be an artifact of the emulation process itself. Clock skews in the emulation system are often different from those that will result when the netlist description of the circuit design is implemented as an integrated circuit. The reason for this is that when implementing the netlist in the emulation system, the netlist must be partitioned, or "broken up", and implemented in many different programmable logic devices. The clock skews introduced by the programmable logic devices, and the interconnect structure will not be present in the actual integrated circuit produced with the netlist (i.e., the hold time violations that occur in the emulation system are not likely to occur in the actual integrated circuit produced with the netlist).

As the complexity of integrated circuits increases, and therefore the number of sequential logic elements implemented in a single design increases (only sequential logic elements such as flip flops and latches are "clocked" by the clock structure of the emulated circuit), the number of hold time violations that are experienced tend to increase.

As disclosed in the Chen et al application, the software used to implement the netlist in the emulation system processes the netlist with the intention of reducing the occurrence of hold time violations. Thus, initially, the clock structure of the netlist is analyzed. During this analysis, several steps occur in order to build what is known as netlist "clock trees". A clock tree, as discussed in the Chen et al application, is a compilation of circuit components used to derive all the internal clock signals (an internal clock signal is a signal which directly controls the clocking of a sequential logic element, e.g., the net input to the clock input of the sequential logic element) from the netlist's external clock sources (an external clock source is a primary input terminal specified by the user to be a clock source). Each clock tree is roomed at the external clock source and comprises all the logic elements (both combinational and sequential) between the external clock source and internal clock signal. In a small minority of designs, the external clock source will drive all the internal sequential logic elements directly. In this situation, the clock tree will be an empty set. However, in most designs, the clock tree will contain both combinational and sequential logic elements.

As discussed in Chen et al, a portion of the clock tree responsible for generating a predetermined number of clock signals is selected for implementation in one of the emulation system's programmable logic devices specifically dedicated to clock generation. This is done in an attempt to keep all clock generation resources inside a single programmable logic device, which aides in reducing hold time violations. The clock signals generated by this dedicated programmable logic device are called "global clock" signals and are used to derive other clock signals. The clock paths of the global clock signals are implemented in the dedicated programmable logic device. The global clock signals become the critical clock paths of the clock tree.

If the same clock signal is going to be used in more than one programmable logic device when the netlist is implemented in the emulation system, that portion of the clock tree generating that clock signal must be identified and duplicated in each device using that clock signal. Because of this duplication, the clock tree has to be made as small as possible. Otherwise, the duplicated portion of the clock tree will use too much of the capacity of the programmable logic device, leaving too few resources for other logic gates. However, it is critical that the clock tree not be trimmed arbitrarily, as it must contain all of the critical nets used for generating the internal clock signals.

In prior art emulation systems, much of the clock tree generation is performed by the person using the emulation system. First, the emulation system will identify a "worst-case" clock tree that includes all the potential clock paths. Then, the emulation system will provide a list of all the combinational elements within the clock tree having multiple inputs. In typical design methodology, only one of the input signals to a combinational logic element is in the critical clock math. Otherwise, the output of that combinational logic element will be unpredictable. The remaining inputs to the combinational logic elements are generally supplied by slower signals used to control the faster clock. These slower signals which control the faster clock are known "clock qualifiers". In short, a clock qualifier is any signal which is used to gate a clock signal.

The prior art method of identifying clock qualifiers will now be discussed. Basically, the prior art method of identifying clock qualifiers has three steps. First, the user specifies signals as clock qualifiers. Then, the emulation system marks all other potential clock qualifiers and provides this list to the user. Finally, the user verifies whether the signals marked by the emulation system as clock qualifiers are in fact clock qualifiers.

Prior art emulation systems mark potential clock qualifiers in the following manner. Starting from each user-specified clock strobe (a clock strobe, as defined in the Chen et al application, is the I/O write signal), the combinational gates are traced through in order to derive signal nets from each clock strobe. All output signals of each storage instance which receives a clock input signal from the derived signal nets are marked as a clock qualifier.

At this point, the prior art emulation system still has not identified all the potential clock qualifiers. Prior art emulation systems require additional steps to find the clock qualifiers not yet marked. In these additional steps, the emulator traces forward from each user specified clock source, through all the signal paths from that clock source, to all clock signal input terminals of storage instances reachable through combinational elements and storage instances. Then, after all clock sources are forward traced, the emulator back traces from the clock signal input terminals on the storage instances, through each signal path, and then marks as a potential clock qualifier all the input signals of the combinational gates and all data input signals of storage instances encountered, except for those logic elements with only a single input.

At this point, as noted above, the user must specify which of those signals marked as a potential clock qualifier is in fact a clock qualifier.

In the prior art, those signals which the user verifies as clock qualifiers are removed, or "trimmed", from the clock tree. This is done so that only the those critical nets used for generating the internal clock signals remain on the clock tree.

When a complex integrated circuit design is being emulated, this prior art process of marking potential clock qualifiers and having the user determine which potential clock qualifiers are in fact clock qualifiers is very tedious and time consuming because the prior art method might mark several thousand signals as potential clock qualifiers. Hence, there is a need for a method that will be more discriminate in identifying signals as potential clock qualifiers.

SUMMARY OF THE INVENTION

The present invention overcomes the problems and disadvantages of the prior art through a unique method of identifying potential clock qualifiers in a netlist description of an integrated circuit. Specifically, the present invention operates by initially setting the speed of each net within the netlist to "zero". Next, the potential clock nets are marked by first setting the speed of the user-specified clock sources to "one". Then, the speed of the output of every logic element is set to "one" if one of its inputs has a speed of "one".

After the potential clock nets are marked, the maximum speed of each net is computed. This is done according to what type of logic element the net being evaluated is output from. The speed of an output net for combinational logic is set to be equal to the speed of the fastest input. The speed of an output net for a sequential logic element without feedback is set to be the faster of either the speed of the data input net or one-half the speed of the clock input net. The speed of an output net for a sequential element with feedback is set to one-half the speed of the clock input net.

After the maximum speed of the nets is computed, the netlist is trimmed by tracing back from each internal clock signal to a clock source. Specifically, when a logic element with multiple inputs is reached during backward trim, the fastest net is labeled as the critical clock net and the slower inputs are marked as potential clock qualifiers. The only exception to this rule is when the logic element is a multiplexer. If the logic element is a multiplexer, all the inputs are labeled as critical clock nets while the select inputs to the multiplexer are marked as potential clock qualifiers.

The above and other preferred features of the invention, including various novel details of implementation and combination of elements will now be more particularly described with reference to the accompanying drawings and pointed out in the claims. It will be understood that the particular methods and circuits embodying the invention are shown by way of illustration only and not as limitations of the invention. As will be understood by those skilled in the art, the principles and features of this invention may be employed in various and numerous embodiments without departing from the scope of the invention.

BRIEF DESCRIPTION OF THE DRAWINGS

Reference is made to the accompanying drawings in which are shown illustrative embodiments of aspects of the invention, from which novel features and advantages will be apparent.

DETAILED DESCRIPTION OF THE DRAWINGS

Turning to the figures, the presently preferred method of the present invention will now be described.

Figure 1:
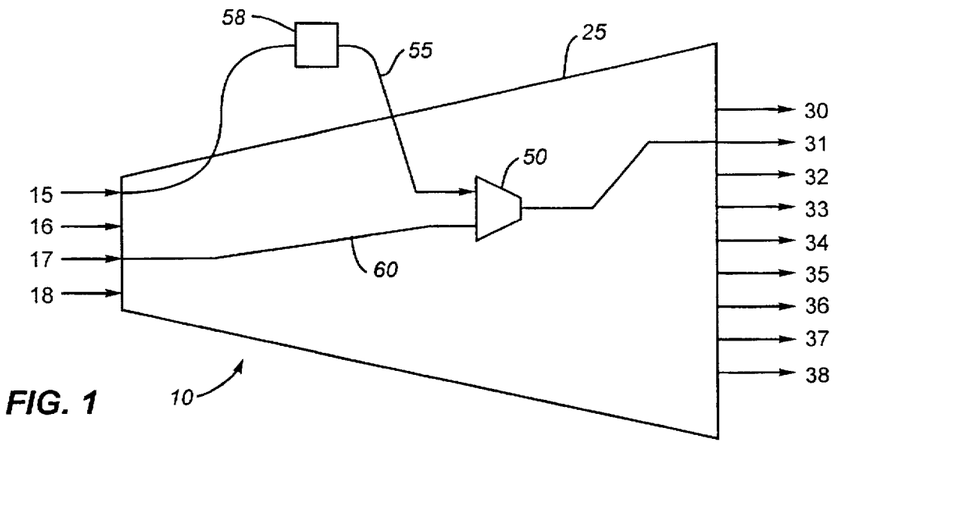
FIG. 1 is a simplified schematic of a small portion of a circuit to be implemented in a reprogrammable logic emulation system.

FIG. 1 shows a generic example of a small portion of a circuit 10 to be implemented in a reprogrammable logic emulation system. The circuit 10 is comprised of external clock sources 15, 16, 17, 18 which are the foundation for the clock signals utilized in the circuit to be emulated. In this example, the circuit 10 has its clock tree 25 rooted at the external clock sources 15, 16, 17, 18. The clock tree 25 is comprised of those components used to derive internal clock signals 30, 31, 32, 34, 35, 36, 37, 38. In the example shown, the internal clock signal 31 is derived from clock source 17, combinational logic element 50 and slow control signal path 55 containing logic element 58. The combinational logic element 50, which here is shown as a two-input gate, is the element that controls the clock in order to create the internal clock signal 31. One input to combinational logic element 55 is the critical clock path 60. In addition to the critical clock path 60, slow control signal path 55 is input to the combinational logic element 50. The output of the combinational logic element 50 is the internal clock signal 31 that is distributed throughout the emulator.

When using a logic emulation system, the user first loads the netlist description of the design undergoing emulation into a computer or other device that controls the emulator. Then, the emulation system may ask for certain specific information concerning the design that will aid the emulator in implementing the design. For example, the emulation system will ask the user to specify where the clock sources are in the design.

Figure 2A:
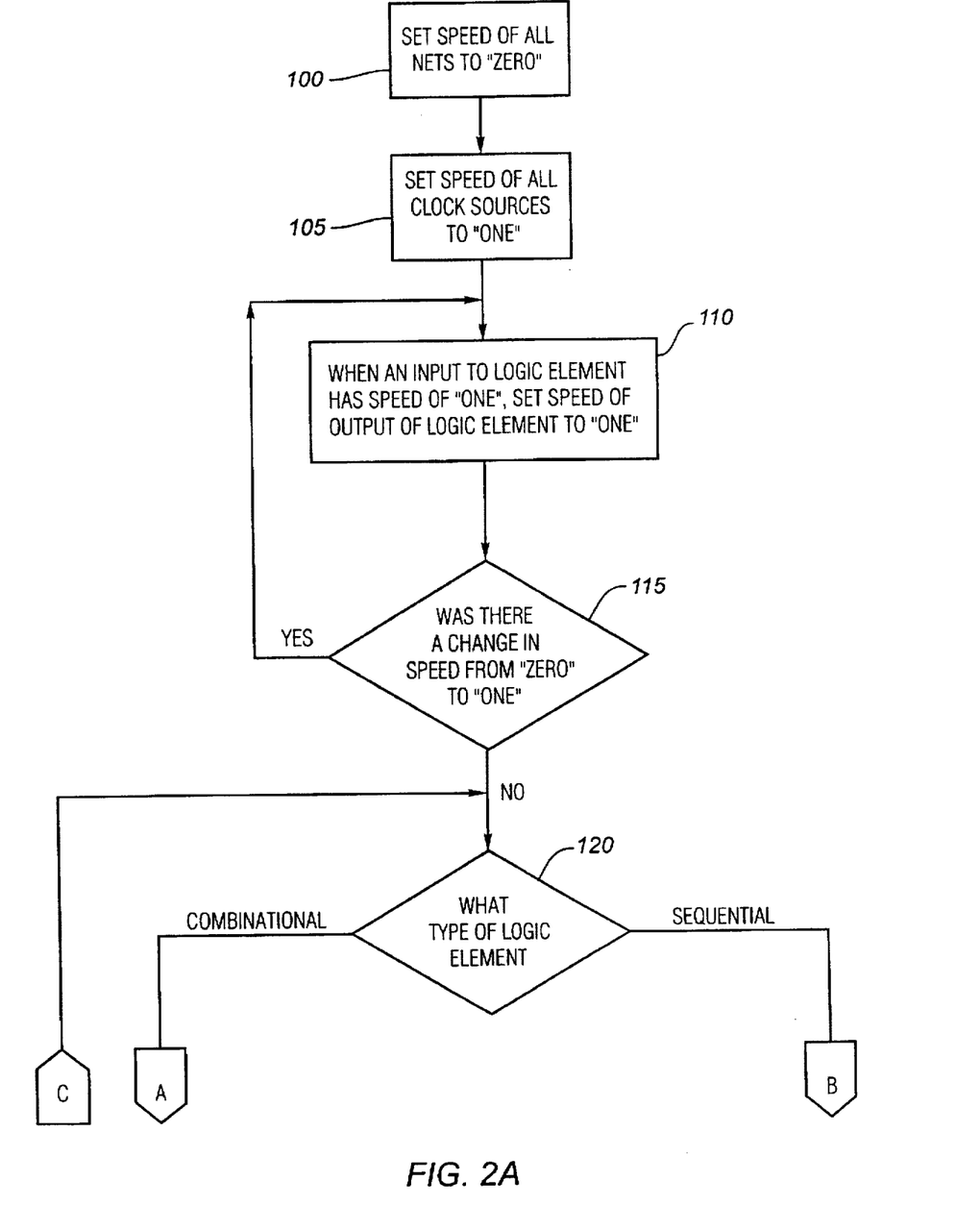
FIGS. 2a–2c provide a flow chart of an embodiment of the present invention used to automatically select a clock qualifier.
Figure 2B:
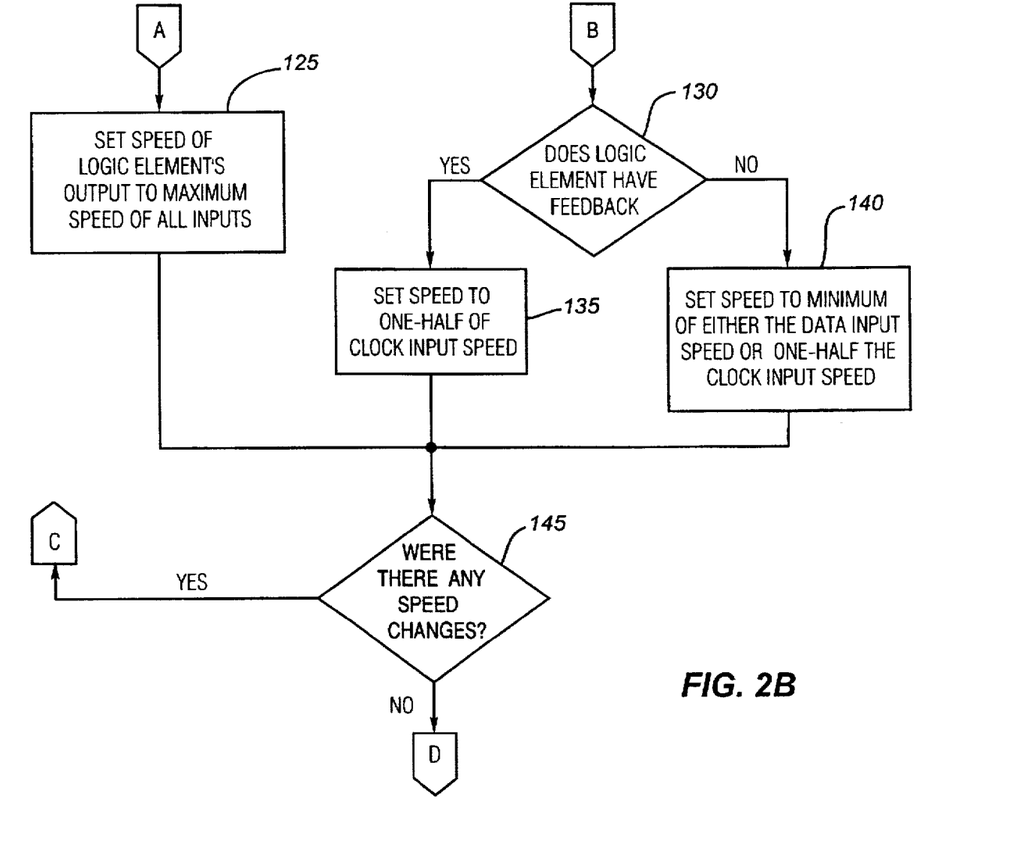
Figure 2C:
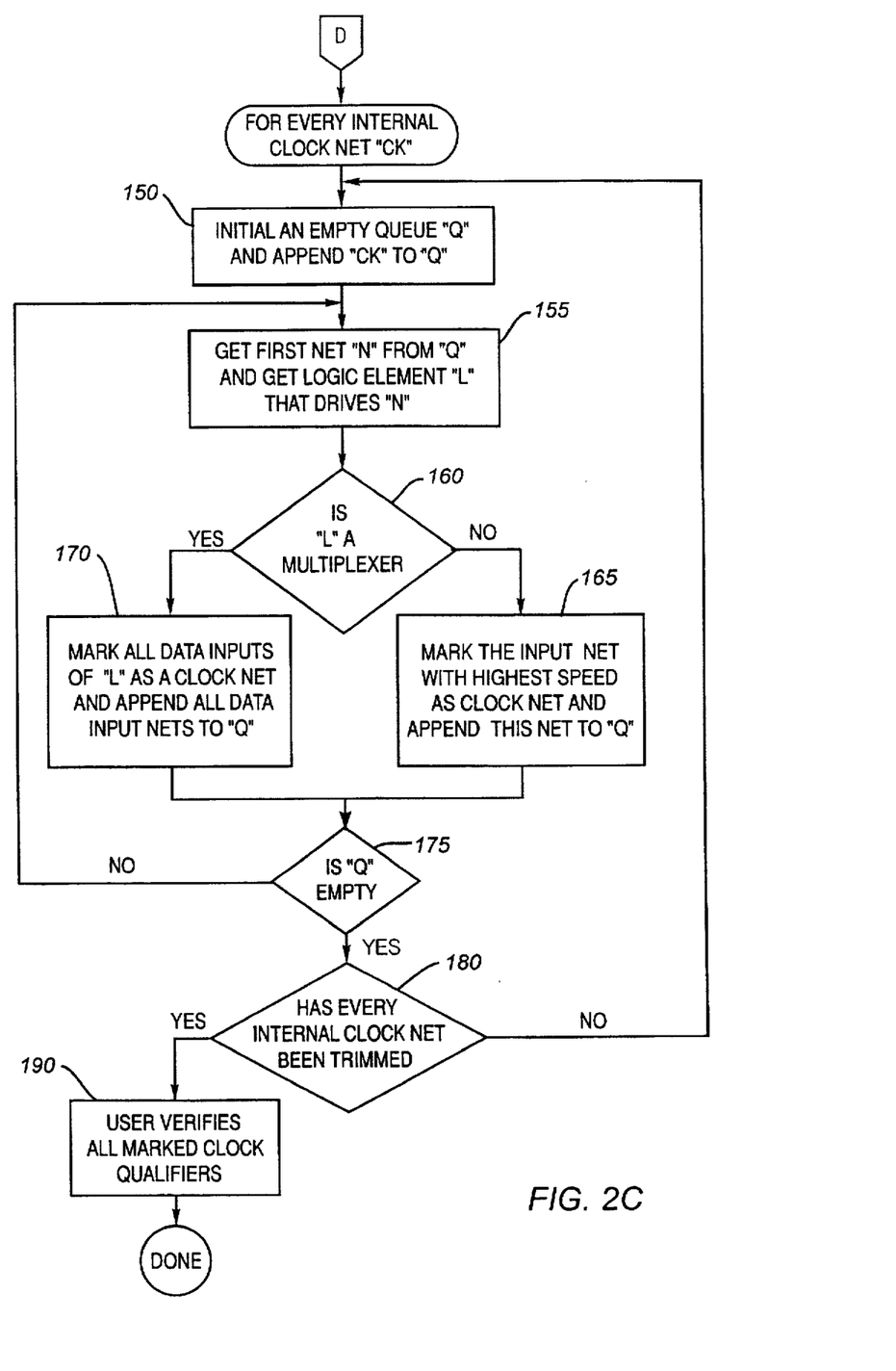

As discussed, the various embodiments of the invention discriminately identify which signals are clock qualifiers. Referring to FIGS. 2a–2c, an embodiment of the method of the present invention will be discussed. The invention operates by determining the potential speed of every signal (i.e., "net") within the user's netlist. The first step of an embodiment of the present invention, known as the initialization step shown at step 100, is to set the speed of every net in the netlist description of the design to "0".

After the speed of every net in the netlist is set to "0", the emulation system, at steps 105–115, marks all the potential clock nets. As shown at step 105, the speed of all user-specified clock nets is set to "1". Then, at step 110, for each logic element in the netlist, when the speed of an input to a logic element is "1", the speed of the output of that logic element is set to "1". The emulation system, at step 115, repeats step 110 until every signal with a path to a user-specified clock source has its speed set to "1".

Figure 3:
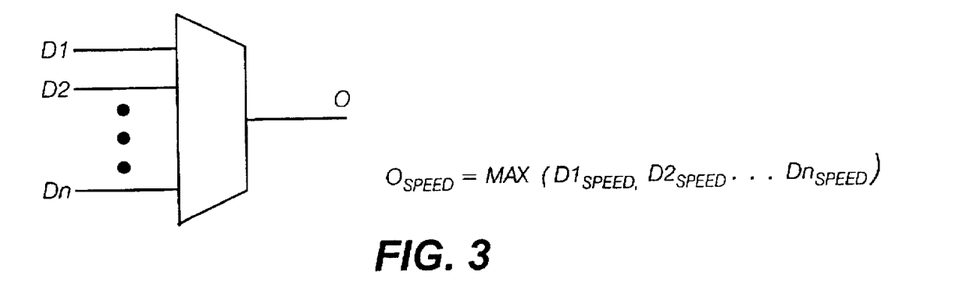
FIG. 3 is a diagram showing the rule for computing the maximum speed of a combinational logic element.

After all the potential clock nets are marked, the maximum speed of a logic element's output is computed, which occurs at steps 120–145. At step 120, the logic emulation system determines whether the logic element being evaluated is a combinational logic element or a sequential logic element. If the logic element is a combinational logic element, the emulator, at step 125, sets the output speed to the speed equal to the fastest of all the input nets. An example of such a combinational logic element is shown in FIG. 3.

Figure 4:
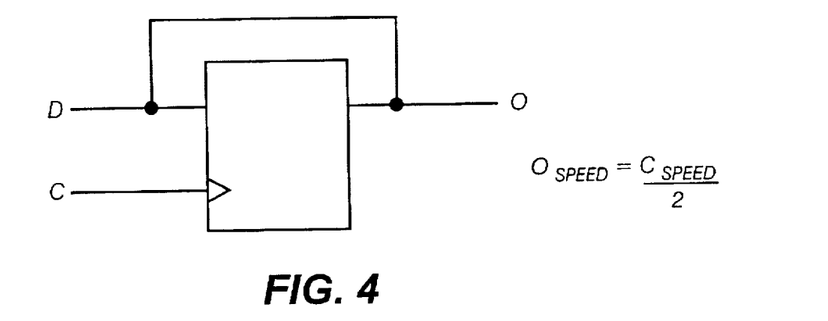
FIG. 4 is a diagram showing the rule for computing the maximum speed of a sequential logic element with feedback.
Figure 5:
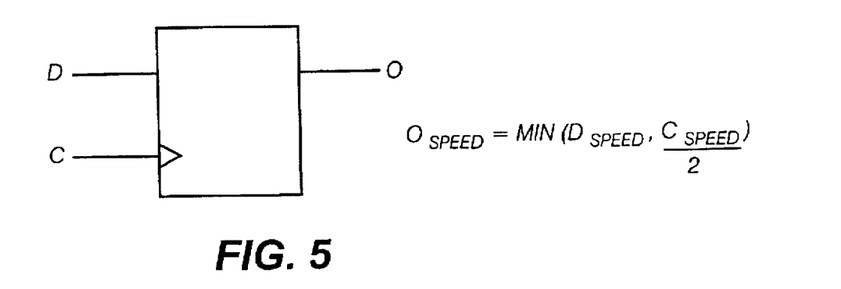
FIG. 5 is a diagram showing the rule for computing the maximum speed of a sequential logic element without feedback.

If the logic element is not a combinational element, the emulator determines, at step 130, whether it is a sequential logic element with or without feedback. If the logic element is a sequential logic element with feedback, the emulator, at step 135, sets the output speed to one-half the speed of the clock input speed. An example of a sequential logic element with feedback is shown in FIG. 4. If, however, the logic element is a sequential logic element without feedback, the emulator, at step 140, sets the output speed to either the speed of the data input signal or one-half the speed of the lock input net, which ever is slower. An example of a sequential logic element without feedback is shown in FIG. 5. The emulator, at step 145, repeats steps 120–145 until no more speed changes are made.

After the maximum speed of the logic elements is computed, a backward trim from the internal clock signals 30, 31, 32, 33, 35, 36, 37, 38 (these signals are shown in FIG. 1) to the clock sources 15, 16, 17, 18 (these clock sources are shown in FIG. 1) will occur. During this backward trim, the fastest input to each logic element is marked as the critical clock net while all other inputs to the logic element are marked as clock qualifiers.

One exception to this rule is when the logic element is a multiplexer with multiple inputs. When this occurs, all the input nets are marked as critical clock nets. None of the inputs are marked as clock qualifiers. The reason for this is that multiplexers are often used to select among several different clocks with different speeds. All the select inputs, however, are marked as potential clock qualifiers.

The manner in which this implemented is shown in the flow chart of FIG. 2c. First, at step 150, a queue ("Q") in the emulation software is initialized and an internal clock net ("ck") is appended to the queue "Q". Then, at step 155, the emulator Cakes the first net in the queue "Q" (the first net in "Q" is represented by the variable "N") and gets the logic element "L" driving that net (net "N") In the first pass of the backward trimming process, net "N" will be the only net in the "Q". At step 160, the emulator must determine if the logic element "L" is a multiplexer. If logic element "L" is not a multiplexer, the input net with the highest speed is marked as a clock net and appended to the queue "Q", as shown at step 165. However, if logic element "L" is a multiplexer, all of its data inputs are marked as clock nets and each data input net is appended to queue "Q", as shown at step 170.

At step 175, the emulator determines whether the queue "Q" is empty. Queue "Q" will only be empty when the emulator has traced back all the way to a clock source. Then, at step 180, the emulator will determine whether every internal clock net has been trimmed. If they have not all been trimmed, steps 150–175 are repeated for the next internal clock net. If each internal clock net has been trimmed, the user, at step 190, must verify that all nets that have been marked as clock qualifiers are in fact clock qualifiers. The method of the present invention is much more discriminating than the prior art in marking clock qualifiers. The prior art marked every signal that could possibly be a clock qualifier whereas the present invention, by evaluating the speed of the nets, marks only those slow nets as clock qualifiers. Because the method of the present invention is much more discriminating in marking potential clock qualifiers than is the case with the prior art, much fewer potential clock qualifiers will have been marked. This will greatly reduce the amount of time necessary for the user to verify whether nets marked as clock qualifiers are in fact an actual clock qualifiers.

Figure 6:
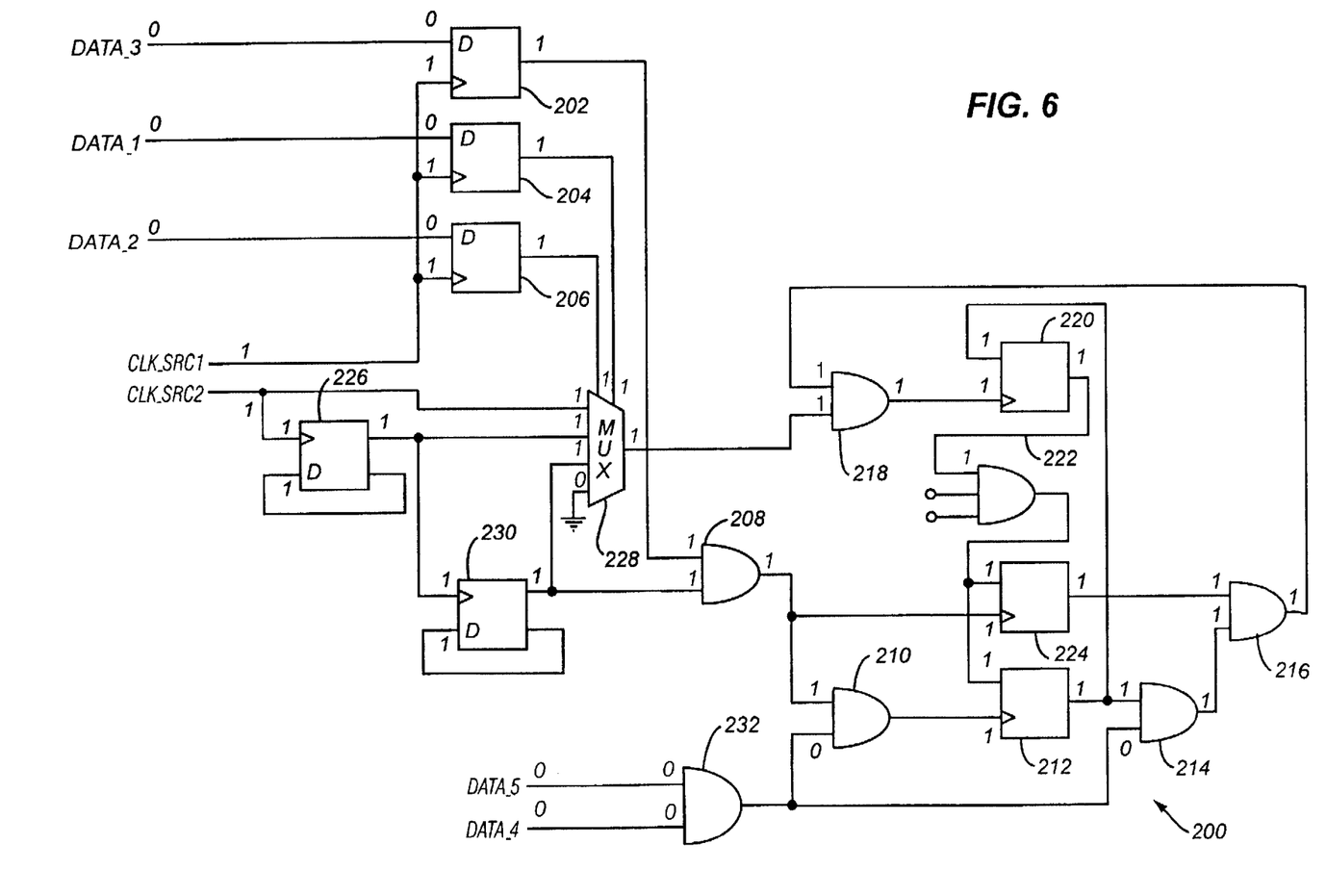
FIG. 6 is a circuit diagram used to show an example of how an embodiment of the present invention initializes and marks potential clock nets.

FIG. 6 depicts in exemplary fashion how the present invention initializes a netlist and the marks potential clock nets. Circuit 200 is shown. To initialize the netlist, as seen in step 100 of FIG. 2a, every net is set to "0". Then, the speed of every clock source is set to "1", as shown at step 105 of FIG. 2a. In the example of FIG. 6, the clock sources are labeled as CLK_SRC1 and CLK_SRC2. Thus, nets from CLK_SRC1 and CLK_SRC2 are marked with a speed of "1".

The next step, shown at step 110 of FIG. 2a, is to set the speed of the output of each logic element receiving an input net with a speed of "1" to "1". Thus, in the circuit 200 of FIG. 6, because CLK_SRC1 (which has a speed of "1") is input to the clock inputs of sequential logic elements 202, 204, 206, the outputs of sequential logic elements 202, 204, 206 have their speed set to "1" (sequential logic elements 202, 204, 206 have as their data inputs DATA_3, DATA_1 and DATA_2, respectively). Sequential logic element 202 sources AND gate 208. Because an input to AND gate 208 has a speed of "1", its output speed is also set to "1".

Continuing, AND gate 208 sources both AND gate 210 and sequential logic element 224. Because AND gate 208 sources AND gate 210 with a net having a speed of "1", the speed of the output of AND gate 210 is set to "1". Because the speed of the output of AND gate 210 is "1", the output of sequential logic element 212, which is sourced by AND gate 210, is "1". Sequential logic element 212 sources two logic elements. First, sequential logic element 212 sources AND gate 214. Because the speed of the output of sequential logic element 212 is "1", the output of AND gate 214 is "1". AND gate 214 sources AND gate 216. Thus, the speed of the output of AND gate 216 is set to "1". AND gate 216 sources AND gate 218. Thus, the speed of the output of AND gate 218 is set to "1". AND gate 218 sources sequential logic element 220. Thus, the speed of the output of sequential logic element 220 is set to "1". Sequential logic element 220 sources AND gate 222. Thus, the speed of the output of AND gate 222 is set to "1".

AND gate 222 sources both sequential logic element 224 and sequential logic element 212. Because a net with a speed of "1" is input to sequential logic element 224, the speed of the output of sequential logic element 224 is set to "1". Since the speed of the output of sequential logic element 224 is "1", the emulator would normally have set the speed of AND gate 216 to "1". However, since this was done already, tracing through this path is ceased. In addition, as discussed, AND gate 222 sources sequential logic element 212. In as much as the speed of the output of sequential logic element 212 was already set to "1", the tracing through this path is likewise ceased.

As discussed above, AND gate 208 sourced sequential logic element 224 in addition to AND gate 210. Because the speed of the output of AND gate 208 is "1", the output of sequential logic element 224 should be set to "1". However, since the speed of the output of sequential logic element 224 was already set to "1", the tracing through this path is ceased.

The emulator then continues with tracing through the clock path of the CLK_SRC2. CLK_SRC2 is input to both multiplexer 228 and sequential logic element 226. Because the speed of CLK_SRC2 is "1", the speed of the output of sequential logic element 226 is set to "1". Sequential logic element 226 sources both multiplexer 228 and sequential logic element 230. Because the speed of the output of sequential logic element 226 is "1", the output of sequential logic element 230, which is sourced by sequential logic element 226, is "1". Sequential logic element 230 sources AND gate 208. Because the speed of the output of sequential logic element 230 is "1", the output of AND gate 208, would be set to "1", but the output speed of AND gate 208 was already set to "1" so the tracing through this path is ceased.

Finally, as discussed, CLK_SRC2 sources multiplexer 228. Because of this, the speed of the output of multiplexer 228 is set to "1". Multiplexer 228 sources AND gate 218. Because the speed of the output of multiplexer 228 is "1", the output of AND gate 218 should be set to "1". However, since the speed of the output of AND gate 218 was already set to "1", the tracing through this path is ceased. Because AND gate 232 has as its inputs DATA_4 and DATA_5, it is not sourced with a clock source. The input nets of AND gate 232 have a speed marked as "0" and its output has a speed marked as "0". Thus, in the example of FIG. 6, steps 110–115 have been completed.

Figure 7:
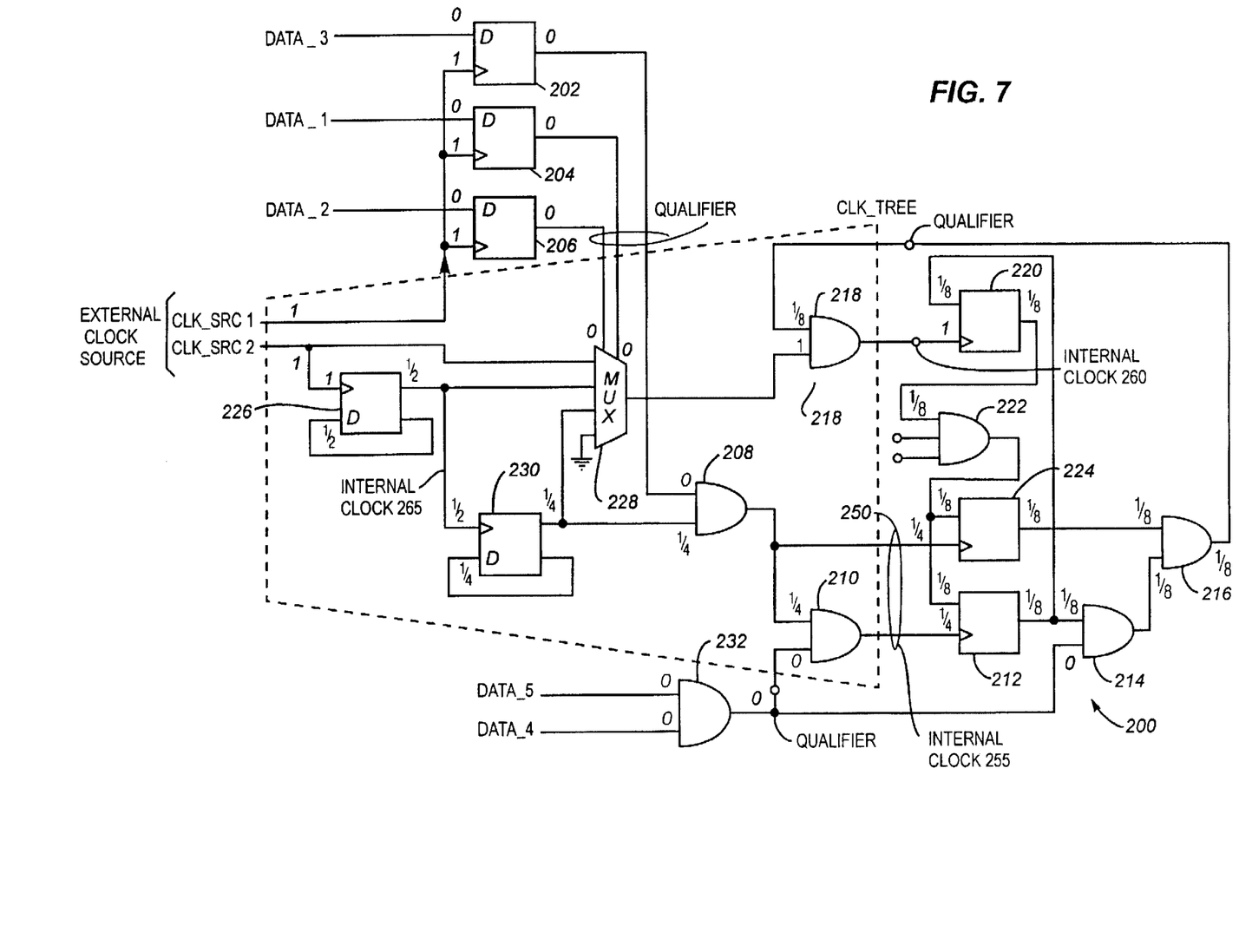
FIG. 7 is a circuit diagram used to show an example of how an embodiment of the present invention computes the maximum speed of a net.

Referring now to FIG. 7, those steps where the speed of each net is computed, shown at steps 120–180 of FIGS. 2a, 2b and 2c, will be illustrated for the same circuit 200 as FIG. 6.

Logic elements 202, 204 and 206 are sequential logic elements without feedback. Thus, the speed of the output of each is set to the slower of either the data input speed or one-half the clock input speed. Because the data input speed on each is "0", the output speed of each is set to "0".

For logic element 226, a sequential logic element with feedback, the output speed is set to one-half the clock input speed. Since the clock input of logic element 226 is sourced by CLK_SRC2, the speed of the output of logic element 226 is set to "½".

For logic element 230, a sequential logic element with feedback, the output speed is set no one-half the clock input speed. Since the clock input of logic element 230 is sourced by the output of logic element 226, which has a speed of "½", the output speed of logic element 230 is For AND gate 208, the speed of the output is see to be equal to the speed of the fastest input. Since a net with a speed of "¼" is input from logic element 230 and a net with a speed of "0" is input from logic element 202, the output speed of AND gate 208 is set to "¼".

For logic element 224, a sequential logic element without feedback, the output speed is set to the slower of either the data input speed or one-half the clock input speed. Since a net with a speed of "¼" is input from AND gate 208 to the clock input, the output speed of logic element 224 is set to "⅛".

For AND gate 210, the output speed is set to be equal to the speed of the fastest input. Since a net with a speed of "¼" is input from AND gate 208 and a net with a speed of "0" is input from AND gate 232, the output speed of AND gate 210 is set to "¼".

For logic element 212, a sequential logic element without feedback, the output speed is set to the slower of either the data input speed or one-half the clock input speed. Since a net with a speed of "¼" is input from AND gate 210 to the clock input, the output speed of logic element 212 is set to "⅛".

For AND gate 214, the output speed is set to be equal to the speed of the fastest input. Since a net with a speed of "⅛" is input from logic element 212 and a net with a speed of "0" is input from AND gate 232, the output speed of AND gate 214 is set to "⅛".

For multiplexer 228, the output speed is set to be equal to the speed of the fastest input. Since one of the inputs is CLK_SRC2, which has a speed of "1", the output speed of multiplexer 228 is set to "1".

For AND gate 216, the output speed is set to be equal to the speed of the fastest input. Since a net with a speed of "⅛" is input from logic element 224 and a net with a speed of "⅛" is input from AND gate 214, the output speed of AND gate 216 is set to "⅛".

For AND gate 218, the output speed is set to be equal to the speed of the fastest input. Since a net with a speed of "⅛" is input from AND gate 216 and a net with a speed of "1" is input from multiplexer 228, the output speed of AND gate 218 is set to "1".

For logic element 220, a sequential logic element without feedback, the output speed is set to the slower of either the data input speed or one-half the clock input speed. Since a net with a speed of "⅛" is input from logic element 212 to the data input and a net with a speed of "1" is input from AND gate 218 to the clock input, the output speed of logic element 220 is set to "⅛".

For AND gate 222, the output speed is set to be equal to the speed of the fastest input. Since a net with a speed of "⅛" is input from logic element 222 and two nets with speeds of "0" are input to the remaining inputs, the output speed of AND gate 222 is set to "⅛".

The location of the internal clock signals is computed prior to marking potential clock qualifiers. Internal clocks signals are those signals input to the clock input of a sequential logic element. In the circuit of FIG. 7, the internal clock signals are the outputs of AND gates 208, 210, 218 and sequential logic element 226. In order to mark the potential clock qualifiers, the netlist is backward trimmed from the internal clock signals 250, 255, 260, 265 to the clock sources CLK_SRC1 and CLK_SRC2. As discussed, during this backward trim, the fastest input to each logic element encountered is marked as the critical clock net while all other inputs to the logic element are marked as clock qualifiers, unless the logic element is a multiplexer.

When back trimming from internal clock signal 250, AND gate 208 is encountered. The input with a speed of "¼" (which is received from logic element 230) is marked as the critical clock net and the input with a speed of "0" (which is received from logic element 202) is labeled as a potential clock qualifier. The next component encountered is logic element 230. Since the only input to logic element 230 is a clock input, that input must be in the critical clock path. The data input on logic element 230 is input as feedback from itself. Therefore, it cannot be a clock qualifier. The next element encountered is logic element 226. Since the only input to logic element 226 is a CLK_SRC2, that input must be in the critical clock path. As with logic element 230, the data input on logic element 226 is input as feedback from itself. Therefore, it cannot be a clock qualifier. Because the clock source has been reached (CLK_SRC2), the backward trim for internal clock signal 250 is now complete.

When back trimming from internal clock signal 255, AND gate 210 is encountered. The input to AND gate 210 with a speed of "¼" (which is received from AND gate 208) is marked as the critical clock net and the input with a speed of "0" (which is received from AND gate 232) is marked as a potential clock qualifier. The next component encountered along the critical clock path is AND gate 208, which has already been trimmed.

When back trimming from internal clock signal 260, AND gate 218 is encountered. The input to AND gate 218 with a speed of "1" (which is received from multiplexer 228) is marked as the critical clock net and the input with a speed of "⅛" (which is received from AND gate 216) is marked as a potential clock qualifier. When the backward trim is continued along the critical clock path, multiplexer 228 is encountered. As discussed, when a multiplexer with multiple inputs is encountered in the backward trim, all the input nets are marked as critical clock nets. The select inputs to the multiplexer, which in this case all have a speed of "0", are marked as potential clock qualifiers. At this point, the backward trim will continue from each of the critical clock nets input to the multiplexer 228 until the clock sources are encountered. However, as is clear from the discussion above, in this example, the backward trim would continue without marking anymore potential clock qualifiers.

Internal clock signal 265 is encountered when backward trimming from internal clock signals 250 and 255. The discussion from those backward trim operations is applicable here as well. Hence, when backward trimming from internal clock signal 265, no additional potential clock qualifiers are encountered.

Now that the emulator has identified the critical clock path for circuit 200, it can build the circuit's clock tree. In circuit 200 shown in FIG. 7, the clock tree, which is labeled CLK_TREE, is comprised of the components 208, 210, 218, 226, 228 and 230. Thus, the internal clock signals CLK_SRC1 and CLK_SRC2 are input to CLK_TREE. Because the nets output from AND gates 208, 210 and 218 form the basis for the remaining clocks in circuit 200, those nets are the internal clocks.

A preferred method of automatic clock qualifier selection in a reprogrammable logic emulation system has been described. While embodiments and applications of this invention have been shown and described, as would be apparent to those skilled in the art, many more embodiments and applications are possible without departing from the inventive concepts disclosed herein. The invention is consequently not to be restricted except in the spirit of the appended claims.

I claim:

1. A method of identifying potential clock qualifier nets in a netlist description of an integrated circuit prior to implementation in a reprogrammable logic emulation system, said netlist including nets which can be specified by the user as clock source nets, said netlist further including login elements with input nets and output nets, said logic elements including combinational logic elements, sequential logic elements with feedback and sequential logic elements without feedback, said input nets of said sequential logic elements with feedback comprising data input nets and clock input nets and said input nets of said sequential logic elements without feedback comprising data input nets and clock input nets, said method comprising:

initializing every net of said netlist to a speed of "zero";
  identifying all potential clock nets by assigning a speed of "one" to all nets with a path to said clock source nets, irrespective of the delay of said potential clock nets;

computing the maximum speed of each of said output nets of each of said logic elements in said netlist, irrespective of the delay of each of said output nets; and marking all of said input nets for a given logic element in said netlist which have a speed less than the highest speed of any input net for that given logic element as one of said potential clock qualifier nets, said computing step comprising the steps of:

setting all said output nets from said combinational logic elements to the highest speed of any of said input nets to said combinational logic elements, irrespective of the delay of said output nets from said combinational logic elements;

setting all said output nets from said sequential logic elements without feedback to either the speed of said data input nets to said sequential logic elements without feedback or to one-half the speed of said clock input nets on said sequential logic elements without feedback, whichever is less, irrespective of the delay of said output nets from said sequential elements without feedback; and setting all of said output nets from said sequential logic elements with feedback to a speed of one-half the speed of said clock input nets on said sequential logic elements with feedback, irrespective of the delay of said output nets from said sequential logic elements with feedback.

2. A method of identifying potential clock qualifier nets in a netlist description of an integrated circuit prior to implementation into a reprogrammable logic emulation system, said netlist description having nets which can be specified by the user as clock source nets, said netlist description further comprising clock nets and logic elements, said logic elements including combinational logic elements having input nets and output nets, sequential logic elements without feedback having clock input nets, data input nets and output nets, and sequential logic elements with feedback having clock input nets, data input nets and output nets, said method comprising:

setting every net of said netlist to a speed of zero, irrespective of the delay of said net;

changing all of said user-specified clock source nets to a speed of one, irrespective of the delay of said user-specified clock source nets;

changing all of said output nets from each of said logic elements to a speed of one whenever one of said input nets to that logic element has a speed of one, irrespective of the delay of said output nets from each of said logic elements;

calculating a maximum speed of each of said output nets of each logic element by:

(a) changing all said output nets from said combinational logic elements to the speed equal to the highest speed of any of said input nets, irrespective of the delay of said output nets from said combinational logic elements;

(b) changing all said output nets from said sequential logic elements without feedback to the speed of either said data input net speed of said sequential logic elements without feedback or one-half the clock input net speed, whichever is less, irrespective of the delay of said output nets from said sequential logic elements without feedback;

(c) changing all said output nets from said sequential logic elements with feedback to the speed of one-half the clock input net speed, irrespective of the delay of said output nets from said sequential logic elements with feedback; and marking any input net to said logic elements that has a speed less than the highest speed of any of said input net to said logic elements as one of said potential clock qualifier nets.

* * * * *